United States Patent
Su et al.

(10) Patent No.: US 12,346,464 B1
(45) Date of Patent: Jul. 1, 2025

(54) DATA ENCRYPTION METHOD AND RELATED COMPONENT

(71) Applicant: SUZHOU METABRAIN INTELLIGENT TECHNOLOGY CO., LTD., Jiangsu (CN)

(72) Inventors: Zhenyu Su, Jiangsu (CN); Zheng Xu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/115,721

(22) PCT Filed: Nov. 29, 2023

(86) PCT No.: PCT/CN2023/135196
§ 371 (c)(1),
(2) Date: Mar. 26, 2025

(87) PCT Pub. No.: WO2024/207764
PCT Pub. Date: Oct. 10, 2024

(30) Foreign Application Priority Data

Apr. 6, 2023 (CN) .......................... 202310356890.9

(51) Int. Cl.
*G06F 21/60* (2013.01)

(52) U.S. Cl.
CPC .................................. *G06F 21/602* (2013.01)

(58) Field of Classification Search
CPC ....................................................... G06F 21/602
See application file for complete search history.

(56) References Cited

U.S. PATENT DOCUMENTS

| | | | |
|---|---|---|---|
| 2004/0193763 A1* | 9/2004 | Iizuka | G06F 13/24 710/52 |
| 2016/0294818 A1* | 10/2016 | Badam | G06F 21/602 |
| 2020/0097676 A1* | 3/2020 | Margel | G06F 21/316 |

FOREIGN PATENT DOCUMENTS

| | | |
|---|---|---|
| CN | 108763917 A | 11/2018 |
| CN | 112632581 A | 4/2021 |
| CN | 116094838 A | 5/2023 |

* cited by examiner

*Primary Examiner* — Sangseok Park
(74) *Attorney, Agent, or Firm* — IPro, PLLC (57) ABSTRACT

The present disclosure provides a data encryption method, applied to a processor in a cryptographic device, where the cryptographic device includes a first storage module, and the method includes: receiving to-be-processed data sent by a server, and distinguishing critical data and non-critical data in the to-be-processed data; performing encryption processing on the critical data in the to-be-processed data to obtain encrypted critical data; and writing the encrypted critical data and the non-critical data into the first storage module to enable a client to read data from the first storage module.

20 Claims, 5 Drawing Sheets

To-be-processed data sent by a server is received, and critical data and non-critical data in the to-be-processed data are distinguished — S11

Encryption processing is performed on the critical data in the to-be-processed data to obtain encrypted critical data — S12

The encrypted critical data and the non-critical data are written into the first storage module to enable a client to read data from the first storage module — S13

DATA ENCRYPTION METHOD AND RELATED COMPONENT

CROSS-REFERENCE TO RELATED APPLICATION

The present disclosure claims the priority of Chinese patent application filed on Apr. 6, 2023 before the CNIPA, China National Intellectual Property Administration with the application number of 202310356890.9, and the title of "DATA ENCRYPTION METHOD AND RELATED COMPONENT", which is incorporated herein in its entirety by reference.

FIELD

The present disclosure relates to the field of data processing, and more particularly to a data encryption method and related components.

BACKGROUND

In the process of data transmission, data is usually classified into importance levels based on importance of the data. For data with a relatively high level, if leakage occurs, it may endanger personal and property safety.

Therefore, in the related art, encryption processing is usually performed on the data with the relatively high level to prevent the data from leaking during transmission. However, in related art, when performing the encryption processing on the data, the data is usually encrypted in a software layer, for example, file encryption, data anonymization or data access authority settings. When using the above method, once hackers invade a system, an encryption system in the software layer will be destroyed, resulting in data leakage. That is, at present, the security of the method of performing data encryption in the software layer is relatively low.

SUMMARY

The purpose of the present disclosure is to provide a data encryption method and related components, which is capable of encrypting and storing critical data using hardware devices, thereby improving the security of performing encryption on the critical data, and avoiding the problem of data leakage caused by hacker intrusion when performing encryption on the data in the software layer. In addition, in the method of the present disclosure, all to-be-processed data transmitted by a server is selectively encrypted without encrypting all the to-be-processed data, and thus the processing method is flexible and convenient, and the power consumption required for encryption is reduced to a certain extent.

In order to solve the above technical problems, the present disclosure provides a data encryption method, applied to a processor in a cryptographic device, where the cryptographic device includes a first storage module, and the method includes:
  receiving to-be-processed data sent by a server, and distinguishing critical data and non-critical data in the to-be-processed data;
  performing encryption processing on the critical data in the to-be-processed data to obtain encrypted critical data; and
  writing the encrypted critical data and the non-critical data into the first storage module to enable a client to read data from the first storage module.

In an embodiment of the present disclosure, receiving the to-be-processed data sent by the server, and distinguishing the critical data and the non-critical data in the to-be-processed data includes:
  receiving the to-be-processed data sent by the server, and identifying whether each piece of to-be-processed data carries an encryption identifier; and
  in response to each piece of to-be-processed data carrying the encryption identifier, determining data carrying the encryption identifier as the critical data, and in response to not each piece of to-be-processed data carrying the encryption identifier, determining data not carrying the encryption identifier as the non-critical data.

In an embodiment of the present disclosure, the cryptographic device further includes a second storage module, after distinguishing the critical data and the non-critical data in the to-be-processed data, the method further includes:
  writing one or more data identifiers corresponding to the critical data into the second storage module;
  performing the encryption processing on the critical data in the to-be-processed data to obtain the encrypted critical data includes:
  reading the one or more data identifiers in the second storage module when processing to-be-processed data that is currently required to be processed;
  determining whether one or more identifiers of the to-be-processed data that is currently required to be processed are the same as the one or more data identifiers in the second storage module;
  in response to the one or more identifiers being the same as the one or more data identifiers, determining to-be-processed data with the same data identifiers as the critical data, and performing the encryption processing on the critical data in the to-be-processed data to obtain the encrypted critical data; and
  in response to the one or more identifiers not being the same as the one or more data identifiers, determining the to-be-processed data that is currently required to be processed as the non-critical data, and directly writing the non-critical data into the first storage module.

In an embodiment of the present disclosure, the processor is provided with a first pointer and a second pointer, and performing the encryption processing on the critical data in the to-be-processed data to obtain the encrypted critical data includes:
  when processing the to-be-processed data, controlling the first pointer to point to one piece of to-be-processed data that is currently required to be processed, and controlling the second pointer to point to one of the one or more data identifiers in the second storage module;
  determining whether the data identifier pointed to by the second pointer and the identifier corresponding to the to-be-processed data pointed to by the first pointer are the same; and
  in response to the data identifier being the same as the identifier, determining the to-be-processed data pointed to by the first pointer as the critical data, and performing the encryption processing on the critical data pointed to by the first pointer to obtain the encrypted critical data, and in response to the data identifier not being the same as the identifier, determining the to-be-processed data pointed to by the first pointer as the non-critical data;

writing the encrypted critical data and the non-critical data into the first storage module includes:
  writing the encrypted critical data into the first storage module, controlling the first pointer to point to next piece of to-be-processed data, and controlling the second pointer to point to a next data identifier; and
  writing the non-critical data into the first storage module, and controlling the first pointer to point to the next piece of to-be-processed data.

In an embodiment of the present disclosure, there are N first storage modules and N second storage modules, the processor is provided with N state machine threads, N first pointers and N second pointers, and the N state machine threads, the N first pointers, the N second pointers, the N first storage modules and the N second storage modules are in a one-to-one correspondence, where N is an integer greater than 1,
  performing the encryption processing on the critical data in the to-be-processed data to obtain the encrypted critical data includes:
    when processing the to-be-processed data, controlling the N first pointers to respectively point to N pieces of to-be-processed data that are currently required to be processed in parallel through the N state machine threads, and controlling each of the N second pointers to point to a data identifier in the second storage module corresponding to the second pointer;
    determining whether the data identifier pointed to by the second pointer is the same as the identifier corresponding to the to-be-processed data pointed to by the first pointer corresponding to the second pointer;
    in response to the data identifier being the same as the identifier, determining the to-be-processed data pointed to by the first pointer as the critical data, and performing the encryption processing on the critical data pointed to by the first pointer to obtain the encrypted critical data; and
    in response to the data identifier not being the same as the identifier, determining the to-be-processed data pointed to by the first pointer as the non-critical data;
  writing the encrypted critical data and the non-critical data into the first storage module includes:
    writing the encrypted critical data into the first storage module corresponding to the first pointer, controlling the first pointer to point to the next piece of to-be-processed data, and controlling the second pointer to point to the next data identifier in the second storage module corresponding to the second pointer; and
    directly writing the non-critical data pointed to by the first pointer into the first storage module corresponding to the first pointer, and controlling the first pointer to point to the next piece of to-be-processed data.

In an embodiment of the present disclosure, the method further includes:
  receiving a control signal sent by the server, and determining a plurality of first target storage modules based on the control signal; and
  controlling the determined first target storage modules and the second storage module corresponding to each of the determined first storage modules to be in a working state.

In an embodiment of the present disclosure, reading, by the client, the data from the first storage module includes:
  enabling, by the client, N state machine threads and reading the data from the N first storage modules in parallel through the N state machine threads, where the N state machine threads are in a one-to-one correspondence with the N first storage modules.

In an embodiment of the present disclosure, after each piece of the data is written into the first storage module, the method further includes:
  determining whether the processing of all received to-be-processed data is completed; and
  determining whether to trigger the client to read the data from the first storage module based on a result of the determining.

In an embodiment of the present disclosure, determining whether to trigger the client to read the data from the first storage module based on the result of the determining includes:
  when it is determined that the processing of all received to-be-processed data is completed, triggering the client to read the data from the first storage module, and when it is determined that the processing of all received to-be-processed data is not completed, not triggering the client to read the data from the first storage module.

In an embodiment of the present disclosure, the first storage module is a single port memory or a single port storage queue.

In an embodiment of the present disclosure, after each piece of the data is written into the first storage module, the method further includes:
  triggering the client to read the data from the first storage module in real time.

In an embodiment of the present disclosure, the first storage module is a dual port memory or a dual port storage queue.

In an embodiment of the present disclosure, the data identifier is a serial number corresponding to the critical data.

In an embodiment of the present disclosure, the second storage module is a register group including a plurality of registers, and each of the plurality of registers stores a data identifier.

In an embodiment of the present disclosure, performing the encryption processing on the critical data in the to-be-processed data to obtain the encrypted critical data includes:
  performing the encryption processing on the critical data using a symmetric cryptographic algorithm to obtain the encrypted critical data.

In an embodiment of the present disclosure, the cryptographic device further includes an encryption module connected to the processor, and performing the encryption processing on the critical data in the to-be-processed data to obtain the encrypted critical data includes:
  sending the critical data to the encryption module to enable the encryption module to perform the encryption processing on the critical data to obtain encrypted critical data; and
  receiving the encrypted critical data sent by the encryption module, and performing the step of writing the encrypted critical data into the first storage module.

In an embodiment of the present disclosure, the cryptographic device further includes a third storage module connected to the processor,
  performing the encryption processing on the critical data in the to-be-processed data to obtain the encrypted critical data includes:
    reading encryption parameters stored in the third storage module, and performing the encryption processing on the critical data based on the encryption parameters to obtain the encrypted critical data.

In an embodiment of the present disclosure, the third storage module is a non-transitory memory.

In order to solve the above technical problems, the present disclosure further provides a data encryption apparatus, applied to a processor in a cryptographic device, where the cryptographic device includes a first storage module, and the apparatus includes:

- a data receiving unit configured to receive to-be-processed data sent by a server, and distinguish critical data and non-critical data in the to-be-processed data;
- an encryption processing unit configured to perform encryption processing on the critical data in the to-be-processed data to obtain encrypted critical data; and
- a data storage unit configured to write the encrypted critical data and the non-critical data into the first storage module to enable a client to read data from the first storage module.

In order to solve the above technical problems, the present disclosure further provides an electronic device, including:

- a memory configured to store a computer program; and
- a processor configured to, when executing the computer program, implement the steps of the data encryption method described above.

In order to solve the above technical problems, the present disclosure further provides a computer non-transitory readable storage medium, on which a computer program is stored, where the computer program, when executed by a processor, causes the processor to perform the steps of the data encryption method described above.

In order to solve the above technical problems, the present disclosure further provides a server, including the above electronic device.

The present disclosure provides a data encryption method and related components, and relates to the field of data transmission. This solution is applied to a processor in a cryptographic device. To-be-processed data sent by a server is received, and critical data and non-critical data in the to-be-processed data are distinguished; encryption processing is performed on the critical data in the to-be-processed data to obtain encrypted critical data; and the encrypted critical data and the non-critical data are written into the first storage module to enable a client to read data from the first storage module. In the present disclosure, the encryption and storage of the critical data are realized by hardware devices, thereby improving the security of performing encryption on the critical data, and avoiding the problem of data leakage caused by hacker intrusion when performing encryption on the data in the software layer. In addition, in the method of the present disclosure, all to-be-processed data transmitted by a server is selectively encrypted without encrypting all the to-be-processed data, and thus the processing method is flexible and convenient, and the power consumption required for encryption is reduced to a certain extent.

BRIEF DESCRIPTION OF THE DRAWINGS

In order to more clearly explain the technical solutions in the embodiments of the present disclosure, accompanying drawings that are required to be used in the embodiments or the prior art will be briefly introduced below. Obviously, the accompanying drawings described below are merely some embodiments of the present disclosure, and a person skilled in the art may obtain other accompanying drawings according to these accompanying drawings without paying creative labor.

DETAILED DESCRIPTION

The core of the present disclosure is to provide a data encryption method and related components, which is capable of encrypting and storing critical data using hardware devices, thereby improving the security of performing encryption on the critical data, and avoiding the problem of data leakage caused by hacker intrusion when performing encryption on the data in the software layer. In addition, in the method of the present disclosure, all to-be-processed data transmitted by a server is selectively encrypted without encrypting all the to-be-processed data, and thus the processing method is flexible and convenient, and the power consumption required for encryption is reduced to a certain extent.

In order to make objects, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are merely a part of the embodiments of the present disclosure, rather than all of the embodiments. All of the other embodiments that a person skilled in the art obtains on the basis of the embodiments of the present disclosure without paying creative labor fall within the protection scope of the present disclosure.

Figure 1:
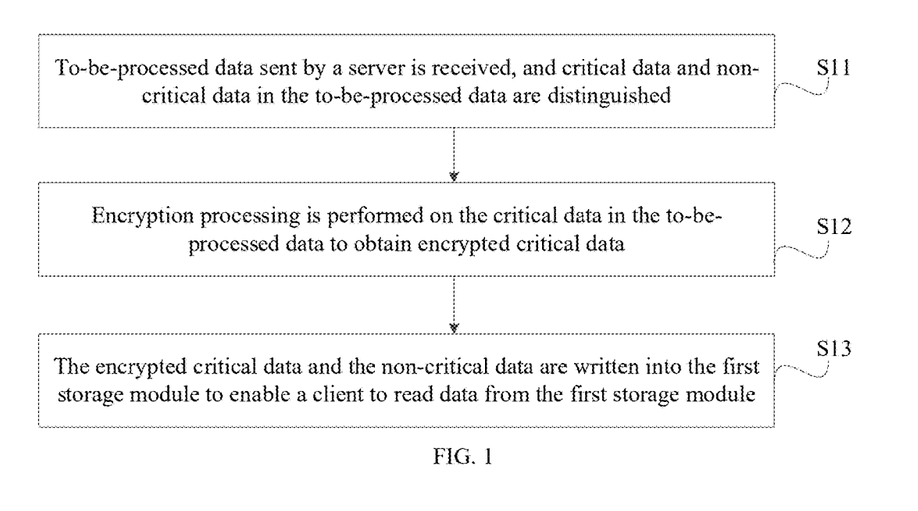
FIG. 1 is a schematic flowchart of a data encryption method according to the present disclosure.
Figure 2:
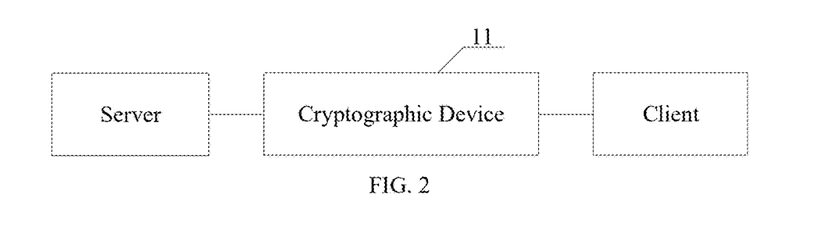
FIG. 2 is a schematic diagram of a connection relationship of a cryptographic device according to the present disclosure.

The present disclosure provides a method of encrypting data using hardware devices (a cryptographic device 11), so that in practical applications, the data may be encrypted directly using the hardware devices or by combining the hardware devices with software layer encryption, thereby improving the security and reliability of data processing, and preventing data leakage. For details, referring to FIG. 1 and FIG. 2. FIG. 1 is a schematic flowchart of a data encryption method according to the present disclosure, and FIG. 2 is a schematic diagram of a connection relationship of a cryptographic device according to the present disclosure. The data encryption method is applied to a processor 21 in the cryptographic device 11, and the cryptographic device 11 includes a first storage module 22. The method includes:

S11, to-be-processed data sent by a server is received, and critical data and non-critical data in the to-be-processed data are distinguished;

S12, encryption processing is performed on the critical data in the to-be-processed data to obtain encrypted critical data; and S13, the encrypted critical data and the non-critical data are written into the first storage module to enable a client to read data from the first storage module.

The cryptographic device 11 in the present disclosure is a hardware device that encrypts or does not encrypt the to-be-processed data when issuing services in a hardware layer. The server sends one or several groups of to-be-processed data to the cryptographic device 11, and the processor 21 in the cryptographic device 11 distinguishes between the critical data and the non-critical data in one or several groups of to-be-processed data, and performs different processing on different kinds of data. The non-critical data is directly stored in the first storage module 22 (that is, the non-critical data is directly transmitted and written in plaintext), the critical data is encrypted first, and then the encrypted critical data is written into the first storage module 22. Through the methods in some embodiments of the present disclosure, all the to-be-processed data may be processed differently without performing or not performing encryption processing on all the to-be-processed data, and thus the implementation method is flexible and simple.

It should be understood that the critical data in the present disclosure can be data with an importance level greater than a preset level, and the non-critical data can be data with an importance level not greater than the preset level. The classification of data levels can be set by users in advance.

Further, the cryptographic device 11 further includes a power module and a clock module. The power module provides a power supply voltage for the cryptographic device 11, and this power module can be a power supply separately provided for the cryptographic device 11 or any power supply in a multiplexing server. The power module can further include a voltage conversion module when voltages required by a plurality of hardware modules in the cryptographic device 11 are different. The clock module is configured to output a reference clock, so that each of the plurality of hardware modules in the cryptographic device 11 can work synchronously based on the reference clock. The specific implementation methods of the power module and the clock module are not limited here.

It can be seen that in the present disclosure, by protecting the critical data in the hardware layer, the security risks in the software layer may be prevented, thereby improving the usage security of the critical data.

It should be further noted that the following embodiments in the present disclosure mainly introduce the implementation method of encrypting the data on the hardware devices, however, in practical applications, when encrypting the data, the encryption method should at least include the method of encrypting the data on the hardware devices as described in the following embodiments, and can also include the method of encrypting the data in the software layer. That is, in the server, both software encryption and hardware encryption can be used at the same time to maximize the security of the data.

The methods of encrypting the critical data using software can include, but are not limited to, encrypting data files containing sensitive information, performing desensitization display on the critical data, or setting access rights for files.

The specific implementation of encrypting data files containing sensitive information is to encrypt the entire data file containing sensitive information in the system software layer, including two methods such as kernel encryption and file system encryption. The kernel encryption is realized by encrypting an initial random access memory (RAM) disk of Linux (operating system kernel), and the file system encryption is realized by Linux device mapping technologies.

The specific implementation of performing desensitization display on the critical data is to perform desensitization display on the critical data in the system interface. For example, not all important information such as personal email address and telephone number is displayed, only a part of the important information is displayed, and rest information is displayed as "****".

The specific implementation of setting access rights for files is to set access rights for files containing critical data, and only users who have access rights to the files can access these files, for example, system administrators, who have read/write rights to the files can access the files, and other users cannot access the files.

The above are only some specific implementation methods provided in some embodiments of the present disclosure, and may also be other implementation methods. The present disclosure is not particularly limited here.

In addition, the to-be-processed data that does not include the critical data may be processed by software layer encryption, and the to-be-processed data that includes the critical data may be processed by hardware device encryption.

Figure 3:
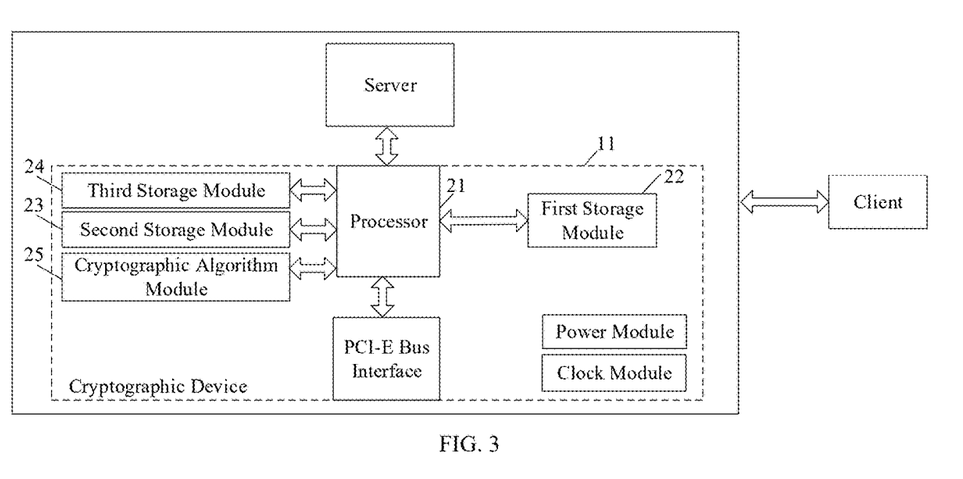
FIG. 3 is a schematic diagram of a specific implementation of a cryptographic device according to the present disclosure.

Based on the above embodiment, referring to FIG. 3, FIG. 3 is a schematic diagram of a specific implementation of a cryptographic device according to the present disclosure.

In an embodiment of the present disclosure, the cryptographic device 11 further includes an encryption module connected to the processor 21, and performing the encryption processing on the critical data in the to-be-processed data to obtain the encrypted critical data includes:

sending the critical data to the encryption module to enable the encryption module to perform the encryption processing on the critical data to obtain encrypted critical data; and receiving the encrypted critical data sent by the encryption module, and performing the step of writing the encrypted critical data into the first storage module 22.

Some embodiments of the present disclosure aim to provide a specific method of encrypting critical data. The cryptographic device 11 is provided with the processor 21 and the encryption module. The processor 21 is used to determine whether it is the critical data and perform data transmission among the first storage module 22, the encryption module and the server. The processor 21 is used to receive the to-be-processed data sent by the server, distinguish the critical data from the non-critical data in the to-be-processed data, write the non-critical data into the first storage module 22, and send the critical data to the encryption module. After receiving the critical data sent by the processor 21, the encryption module performs encryption processing on the critical data and sends the encrypted critical data to the processor 21. The processor 21 writes the received encrypted critical data into the first storage module 22.

In an embodiment of the present disclosure, performing, by the encryption module, the encryption processing on the critical data in the to-be-processed data to obtain the encrypted critical data includes:

performing, by the encryption module, the encryption processing on the critical data using a symmetric cryptographic algorithm to obtain the encrypted critical data.

When the encryption module encrypts the critical data, the encryption algorithm used can be, but is not limited to, the symmetric encryption algorithm such as the advanced encryption standard (AES), the triple data encryption algorithm (3DES) and the ISO block cipher algorithm (SM4). Compared with the hash algorithm, the symmetric encryption algorithm is reversible.

In an embodiment of the present disclosure, the cryptographic device 11 further includes a third storage module 24 connected to the processor 21, performing the encryption processing on the critical data in the to-be-processed data to obtain the encrypted critical data includes:

reading encryption parameters stored in the third storage module 24, and performing the encryption processing on the critical data based on the encryption parameters to obtain the encrypted critical data.

In an embodiment of the present disclosure, the third storage module 24 is a non-transitory memory.

In FIG. 3, the encryption module can include a cryptographic algorithm module 25 and the third storage module 24. The third storage module 24 is used to store encryption parameters such as keys and initial vectors. When encrypting the critical data, the cryptographic algorithm module 25 obtains the encryption parameters stored in the third storage module 24 to encrypt the critical data according to the encryption parameters.

Figure 5:
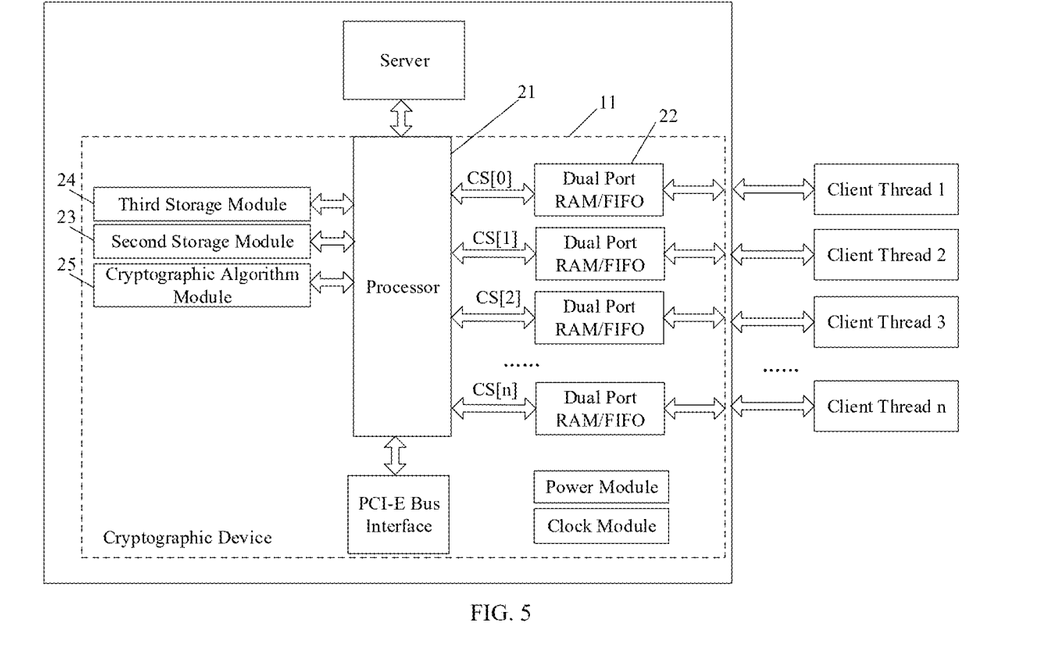
FIG. 5 is a schematic diagram of a data encryption apparatus when performing data parallel processing according to the present disclosure.

The third storage module 24 can be the non-transitory memory. As shown in FIG. 5, the third storage module 24 is implemented as a read only memory (ROM). After the system is powered off, the stored data will not be lost, the security of critical parameters such as keys for storing encryption algorithms is relatively high, and critical encryption parameters such as keys will not be exported to the outside of the cryptographic device 11, thereby ensuring the security of data encryption. In addition, a peripheral component interconnect express (PCI-E) bus interface is a physical bus interface, through which the cryptographic device 11 is inserted into the server for data interaction with the server.

In an embodiment of the present disclosure, receiving the to-be-processed data sent by the server, and distinguishing the critical data and the non-critical data in the to-be-processed data includes:

receiving the to-be-processed data sent by the server, and identifying whether each piece of to-be-processed data carries an encryption identifier; and in response to each piece of to-be-processed data carrying the encryption identifier, determining data carrying the encryption identifier as the critical data, and in response to not each piece of to-be-processed data carrying the encryption identifier, determining data not carrying the encryption identifier as the non-critical data.

Some embodiments of the present disclosure aim to provide a specific method for the processor 21 to distinguish whether the to-be-processed data is the critical data. Before sending the to-be-processed data to the processor 21, the server has already divided the critical data and the non-critical data, and set corresponding encryption identifiers for the critical data, for example, encryption identifier is a character or a string. After receiving the to-be-processed data, the processor 21 directly identifies whether the to-be-processed data carries the encryption identifier, that is, it is determined whether the to-be-processed data is the critical data. Data carrying the encryption identifier is determined as the critical data, otherwise, data not carrying the encryption identifier is determined as the non-critical data.

In some embodiments of the present disclosure, the distinction between the critical data and the non-critical data may be realized, thereby facilitating different processing of data.

In an embodiment of the present disclosure, the cryptographic device further includes a second storage module 23, after distinguishing the critical data and the non-critical data in the to-be-processed data, the method further includes:

writing one or more data identifiers corresponding to the critical data into the second storage module 23;

performing the encryption processing on the critical data in the to-be-processed data to obtain the encrypted critical data includes:

reading the one or more data identifiers in the second storage module 23 when processing to-be-processed data that is currently required to be processed;

determining whether one or more identifiers of the to-be-processed data that is currently required to be processed are the same as the one or more data identifiers in the second storage module 23;

in response to the one or more identifiers of the to-be-processed data that is currently required to be processed being the same as the one or more data identifiers in the second storage module 23, determining to-be-processed data with the same data identifiers as the critical data, and performing the encryption processing on the critical data in the to-be-processed data to obtain the encrypted critical data; and in response to the one or more identifiers not being the same as the one or more data identifiers, determining the to-be-processed data that is currently required to be processed as the non-critical data, and directly writing the non-critical data into the first storage module 22.

Some embodiments of the present disclosure aim to provide a specific method of encrypting critical data. In some embodiments of the present disclosure, the cryptographic device 11 is further provided with the second storage module 23. After receiving the to-be-processed data, the processor 21 determines the critical data according to the encryption identifier of the to-be-processed data, and stores the data identifier corresponding to the critical data in the second storage module 23. When processing the to-be-processed data, a data identifier in the second storage module 23 is obtained, the data identifier is compared with the data identifier of the to-be-processed data that is currently required to be processed to determine whether the compared data identifiers are the same. If the compared data identifiers are the same, it means that the to-be-processed data that is currently required to be processed is the critical data, and then the relevant step of encrypting the critical data is triggered. After the encryption is completed, the encrypted critical data is written into the first storage module 22. When determining that the compared data identifiers are different, it is determined that the to-be-processed data that is currently required to be processed is the non-critical data, at this time, it is not necessary to encrypt the non-critical data, and it is only necessary to directly write the non-critical data into the first storage module 22.

In an embodiment of the present disclosure, the data identifier is a serial number corresponding to the critical data.

In an embodiment of the present disclosure, the second storage module 23 is a register group including a plurality of registers, and each of the plurality of registers stores a data identifier.

The data identifier can be, but is not limited to, the serial number corresponding to the critical data. The second storage module 23 can be, but is not limited to, the register group including a plurality of registers, and each of the plurality of registers only stores one data identifier, that is, each register only stores the serial number corresponding to the one piece of critical data.

It should be noted that the serial numbers corresponding to the critical data stored in the second storage module 23 are stored in turn, and correspondingly, when processing the to-be-processed data in turn, the to-be-processed data is also sequentially processed according to the serial numbers of the to-be-processed data. For example, a packet of to-be-processed data received by the processor 21 is Data[0, 1, ..., n]=0x12, 0x34, 0x56, 0x78, ..., where the data that is required to be encrypted is Data[1]=0x34 and Data[3]=0x78, and thus the processor 21 sends the serial numbers 1 and 3 to the second storage module 23 in turn. When processing the to-be-processed data, the to-be-processed data with the serial number 1 is firstly processed, and the serial number 1 in the second storage module 23 is obtained. If the two serial numbers are determined to be the same, the data with serial number 1 is determined as the critical data, and then the critical data with serial number 1 is encrypted and written into the first storage module 22. Further, the to-be-processed data with a serial number 2 is processed, and the next serial number (namely, the serial number 3) in the second storage module 23 is obtained. If it is determined that the two serial numbers are different, the data with the serial number 2 is determined as the non-critical data, and then the non-critical data with the serial number 2 is directly written into the first storage module 22, and so on, until all the to-be-processed data is processed.

In an embodiment of the present disclosure, the processor 21 is provided with a first pointer and a second pointer, and performing the encryption processing on the critical data in the to-be-processed data to obtain the encrypted critical data includes:
 when processing the to-be-processed data, controlling the first pointer to point to one piece of to-be-processed data that is currently required to be processed, and controlling the second pointer to point to one of the one or more data identifiers in the second storage module 23;
 determining whether the data identifier pointed to by the second pointer and the identifier corresponding to the to-be-processed data pointed to by the first pointer are the same; and
 in response to the data identifier pointed to by the second pointer and the identifier corresponding to the to-be-processed data pointed to by the first pointer being the same, determining the to-be-processed data pointed to by the first pointer as the critical data, and performing the encryption processing on the critical data pointed to by the first pointer to obtain the encrypted critical data, and in response to the data identifier not being the same as the identifier, determining the to-be-processed data pointed to by the first pointer as the non-critical data;
 writing the encrypted critical data and the non-critical data into the first storage module 22 includes:
 writing the encrypted critical data into the first storage module 22, controlling the first pointer to point to next piece of to-be-processed data, and controlling the second pointer to point to a next data identifier; and
 writing the non-critical data into the first storage module 22, and controlling the first pointer to point to the next piece of to-be-processed data.

Some embodiments of the present disclosure aim to provide a specific implementation method for obtaining the data identifier of the to-be-processed data and the data identifier in the second storage module 23 respectively. When the processor 21 is provided with the first pointer and the second pointer, the to-be-processed data that is currently required to be processed is determined by the first pointer, and the data identifier to be compared with the to-be-processed data that is currently required to be processed is determined by the second pointer. Then, it is determined whether the data identifier of the to-be-processed data in the first pointer is the same as the data identifier in the second pointer. If the data identifier of the to-be-processed data in the first pointer is the same as the data identifier in the second pointer, the to-be-processed data is determined as the critical data, and at this time, the related step of encrypting the critical data is triggered, and the encrypted critical data is written into the first storage module 22 after the encryption is completed. Otherwise, the to-be-processed data is determined as the non-critical data, and it is not necessary to encrypt the non-critical data at this time, and it is only necessary to directly write the non-critical data into the first storage module 22.

Further, in order to automatically process the next piece of to-be-processed data, after the to-be-processed data is determined as the critical data, the first pointer is controlled to point to the next piece of to-be-processed data, and the second pointer is controlled to point to the next data identifier. After the to-be-processed data is determined as the non-critical data, the first pointer is controlled to point to the next piece of to-be-processed data, and the direction of the second pointer remains unchanged.

Figure 4:
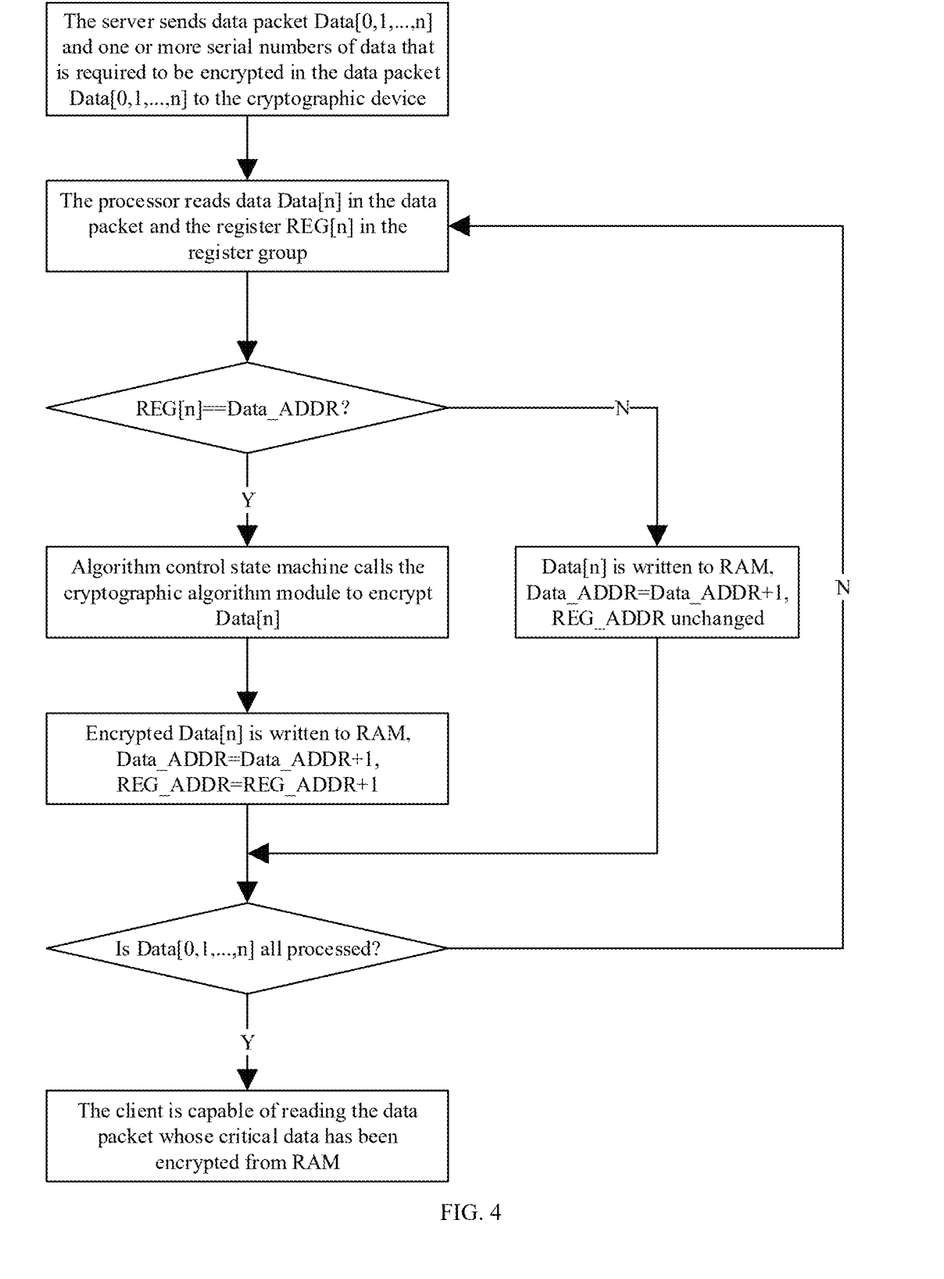
FIG. 4 is a data processing flowchart of a cryptographic device according to the present disclosure.

For example, referring to FIG. 4, FIG. 4 is a data processing flowchart of a cryptographic device according to the present disclosure. The first pointer is a data pointer Data_ADDR, and the second pointer is a register pointer REG_ADDR. The data pointer Data_ADDR stores serial numbers of data in the current data packet, for example, Data_ADDR=0 means that it is pointed to first data Data[0]. The register pointer REG_ADDR points to a register in the second storage module 23 (the register group), for example, REG_ADDR=0 means that it is pointed to a first register REG[0]. During data processing, data Data[0, 1, ..., n] in the data packet to be processed is read according to the data pointer Data_ADDR, starting from the first data Data[0]; and a register in the second storage module 23 (the register group) REG[0, 1, ..., n] is read according to the register pointer REG_ADDR, starting from the first register REG[0]. The processor 21 determines whether a serial number in REG[0] is equal to a serial number 0 of current data in the data pointer Data_ADDR, if REG[0]≠0, it means that Data[0] is the non-critical data and does not require encryption, and the processor 21 directly writes Data[0] into a first address ADDR[0] unit in the first storage module 22. At the same time, a value of the data pointer Data_ADDR is increased by 1 to point to the next piece of data Data[1]; a value of the register pointer REG_ADDR remains unchanged and is still 0, pointing to the current register REG[0]. If REG[0]=0, it means that Data[0] is the critical data and needs to be encrypted. The processor 21 encrypts Data[0] and then writes the encrypted data Data[0] into the address ADDR[0] unit of the first storage module 22. At the same time, the value of the data pointer Data_ADDR is increased by 1 to point to the next piece of data Data[1]; the value of the register pointer REG_ADDR is increased by 1 to point to the next register REG[1]. Repeat the above steps, the processor 21 processes the to-be-processed data Data[1, . . . , n] in turn, and writes the processed data into the address ADDR[1, . . . , n] in the first storage module 22 in turn. After each to-be-processed data is processed, the processor 21 determines whether all the data Data[0, 1, . . . , n] is processed. If all the data Data[0, 1, . . . , n] is processed, the client is triggered to read the data packet including the encrypted critical data from the RAM, otherwise, the processor 21 continues to process the to-be-processed data that has not been processed.

Referring to FIG. 5, FIG. 5 is a schematic diagram of a data encryption apparatus when performing data parallel processing according to the present disclosure. In FIG. 5, the first storage module 22 is implemented as a dual port random access memory (RAM)/first input first output (FIFO), the second storage module 23 is implemented as a register group, and the third storage module 24 is implemented as a read only memory (ROM).

In an embodiment of the present disclosure, there are N first storage modules 22 and N second storage modules 23, the processor is provided with N state machine threads, N first pointers and N second pointers, and the N state machine threads, the N first pointers, the N second pointers, the N first storage modules 22 and the N second storage modules 23 are in a one-to-one correspondence, where N is an integer greater than 1, performing the encryption processing on the critical data in the to-be-processed data to obtain the encrypted critical data includes:

when processing the to-be-processed data, controlling the N first pointers to respectively point to N pieces of to-be-processed data that are currently required to be processed in parallel through the N state machine threads, and controlling each of the N second pointers to point to a data identifier in the second storage module 23 corresponding to the second pointer;

determining whether the data identifier pointed to by the second pointer is the same as the identifier corresponding to the to-be-processed data pointed to by the first pointer corresponding to the second pointer;

in response to the data identifier being the same as the identifier, determining the to-be-processed data pointed to by the first pointer as the critical data, and performing the encryption processing on the critical data pointed to by the first pointer to obtain the encrypted critical data; and in response to the data identifier not being the same as the identifier, determining the to-be-processed data pointed to by the first pointer as the non-critical data;

writing the encrypted critical data and the non-critical data into the first storage module 22 includes:

writing the encrypted critical data into the first storage module 22 corresponding to the first pointer, controlling the first pointer to point to the next piece of to-be-processed data, and controlling the second pointer to point to the next data identifier in the second storage module 23 corresponding to the second pointer; and directly writing the non-critical data pointed to by the first pointer into the first storage module 22 corresponding to the first pointer, and controlling the first pointer to point to the next piece of to-be-processed data.

In an embodiment of the present disclosure, the method further includes:

receiving a control signal sent by the server, and determining a plurality of first target storage modules based on the control signal; and controlling the determined first target storage modules and the second storage module 23 corresponding to each of the determined first storage modules 22 to be in a working state.

In order to further improve the efficiency of data processing, a serial processing mode of the data is changed into a parallel processing mode, which may simultaneously meet the requirements of various data applications on the client. In some embodiments of the present disclosure, N first storage modules 22 are set, and N second storage modules 23 are correspondingly set, at the same time, the control logic of the processor 21 is correspondingly modified, and N state machine threads are set. Each of the N state machine threads controls one first storage module 22 and one second storage module 23, and thus the processor 21 may simultaneously receive multiple groups of different service data sent by the server, and select the state machine thread to control the corresponding first storage module 22 to store the processed data through the control signal, thereby realizing the parallel processing of the data and improving the efficiency.

When the processor 21 is provided with the N first pointers and the N second pointers, N pieces of to-be-processed data that are currently required to be processed are determined by the N first pointers at the same time, and N data identifiers that need to be one-to-one corresponding to and compared with the N pieces of to-be-processed data that are currently required to be processed are determined by the N second pointers. Then, it is determined whether the data identifier of the to-be-processed data corresponding to each of the N first pointers is the same as the data identifier in the second pointer corresponding to the first pointer. If the data identifier of the to-be-processed data corresponding to the first pointer is the same as the data identifier in the second pointer corresponding to the first pointer, the to-be-processed data is determined as the critical data, and at this time, the related step of encrypting the critical data is triggered, and the encrypted critical data is written into the first storage module 22 after the encryption is completed. Otherwise, the to-be-processed data is determined as the non-critical data, and it is not necessary to encrypt the non-critical data at this time, and it is only necessary to directly write the non-critical data into the first storage module 22. Further, in order to automatically process the next piece of to-be-processed data in each of the N groups of data, after the to-be-processed data is determined as the critical data, the first pointer corresponding to each of the N groups of data is controlled to point to the next piece of to-be-processed data, and the second pointer is controlled to point to the next data identifier. After the to-be-processed data is determined as the non-critical data, the first pointer is controlled to point to the next piece of to-be-processed data, and the direction of the second pointer remains unchanged.

In some embodiments of the present disclosure, N groups of to-be-processed data may be processed at the same time, thereby improving the efficiency of data processing.

In an embodiment of the present disclosure, reading, by the client, the data from the first storage module 22 includes:

enabling, by the client, N state machine threads and reading the data from the N first storage modules 22 in parallel through the N state machine threads, where the N state machine threads are in a one-to-one correspondence with the N first storage modules 22.

Correspondingly, when setting the N first storage modules 22, when the client reads the data in the N first storage modules 22, the N state machine threads are enabled, and the N state machine threads are in a one-to-one correspondence with the N first storage modules 22, so that the data in each of the N first storage modules 22 is read respectively.

Figure 6:
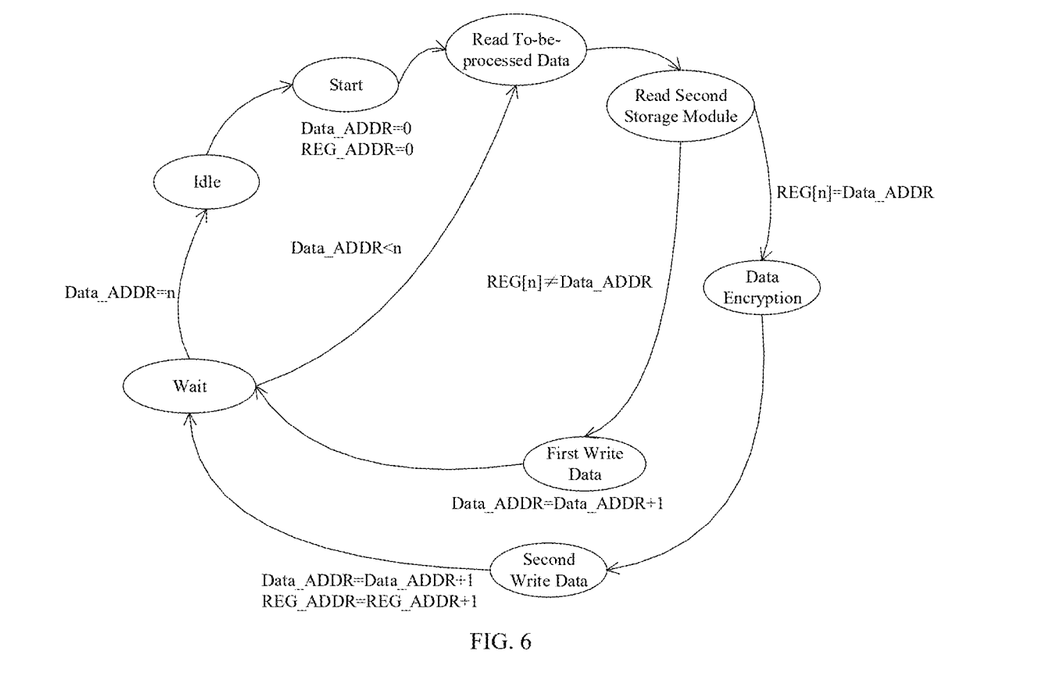
FIG. 6 is a state flowchart of a processor according to the present disclosure.

Referring to FIG. 6, FIG. 6 is a state flowchart of a processor according to the present disclosure. FIG. 6 shows a work flowchart of a state machine thread in the processor 21. For the N state machine threads, the workflows of respective state machine threads are the same.

It should be noted that there are N state machine threads in the processor 21, and correspondingly, when the server sends N arrays to the processor 21, a length of each of the N arrays can be the same or different, and the data to be encrypted can also be the same or different. It should also be noted that these N arrays can be operated at the same time or at different times, and the corresponding state machine threads are started by the corresponding control signals to operate.

For example, a first array is 0x12, 0x34, 0x56, 0x11, 0x57, where the first data 0x12 and the fourth data 0x11 are data to be encrypted in the first array, and the processes of data encryption and writing in the first array are controlled by a control signal CS[0] and a state machine thread 1 shown in FIG. 5. A second array is 0x33, 0x44, 0x56, 0x89, where the second data 0x44 is the data to be encrypted in the second array, and the processes of data encryption and writing in the second array are controlled by a control signal CS[1] and a state machine thread 2 . . . . Similarly, a Nth array is 0x12, 0x34, 0x56, 0x11, 0x, 0xaa, 0x1C, where the fourth data 0x11 and the sixth data 0xaa are data to be encrypted in the Nth array, and the processes of data encryption and writing in the Nth array are controlled by a control signal CS[N] and a state machine thread N.

In an embodiment of the present disclosure, after each piece of the data is written into the first storage module, the method further includes:
determining whether the processing of all received to-be-processed data is completed; and
determining whether to trigger the client to read the data from the first storage module 22 based on a result of the determining.

Firstly, in FIG. 6, a state flow of the processor 21 is as follows. 1) After being reset (restarted or powered on), the cryptographic device 11 enters an idle state. When the reset is completed and the main processor 21 of the server starts the service, the cryptographic device 11 enters a start state. 2) In a start state, a state machine thread sets a data pointer Data_ADDR=0 and a register pointer REG_ADDR=0, and then enters a state of reading to-be-processed data. 3) In the state of reading the to-be-processed data, the state machine reads data Data[n] in a data packet, and then enters a state of reading the second storage module 23. 4) In the state of reading the second storage module 23, the state machine reads a register REG[n] in a register group, when REG[n]=Data_ADDR, the state machine enters a data encryption state, and when REG[n]≠Data_ADDR, the state machine enters a first data write state. 5) In the data encryption state, the state machine calls the cryptographic algorithm module 25 to encrypt the data Data[n], and then enters the second data write state. 6) When REG[n]≠Data_ADDR, the state machine enters a first data write state, and in the first data write state, the state machine writes the data Data[n] into the first storage module 22 and sets Data_ADDR=Data_ADDR+1, and then enters a waiting state. 7) In the second data write state, the state machine writes the encrypted data Data[n] into the first storage module 22, and sets Data_ADDR=Data_ADDR+1 and REG_ADDR=REG_ADDR+1, and then enters the waiting state. 8) In the waiting state, the state machine determines whether all data packets have been processed. If Data_ADDR<n, it means that all data packets have not been processed, and it is necessary to return to the state of reading to-be-processed data and process the next data packet (repeat the above steps until all to-be-processed data is processed). If Data_ADDR=n, it means that all the to-be-processed data have been processed, and then return to the idle state, an operation process has been completed.

Therefore, in some embodiments of the present disclosure, a state that a piece of data is written into the first storage module 22 refers to the waiting state described above. In the waiting state, it is determined whether the processing of all the received to-be-processed data is completed, and it is determined whether to trigger the client to read the data in the first storage module 22 based on the determination result.

In an embodiment of the present disclosure, determining whether to trigger the client to read the data from the first storage module 22 based on the result of the determining includes:
when it is determined that the processing of all received to-be-processed data is completed, triggering the client to read the data from the first storage module 22, and
when it is determined that the processing of all received to-be-processed data is not completed, not triggering the client to read the data from the first storage module 22.

When the first storage module 22 is a single port memory or a single port storage queue, read and write operations are not allowed at the same time; or the control logic level requires that the client can only be triggered to read the data in the first storage module 22 after all the to-be-processed data is processed. After it is determined that the processing of all the received to-be-processed data is completed, the client is triggered to read the data in the first storage module 22, otherwise, the client is not triggered to read the data in the first storage module 22.

In an embodiment of the present disclosure, the first storage module 22 is a single port memory or a single port storage queue.

In the case where the client is triggered to read the data in the first storage module 22 after it is determined that the processing of all the received to-be-processed data is completed, the first storage module 22 can be set as the single port memory or the single port storage queue, for example, the single port RAM, which is lower in cost than the dual port memory or the dual port storage queue.

Figure 7:
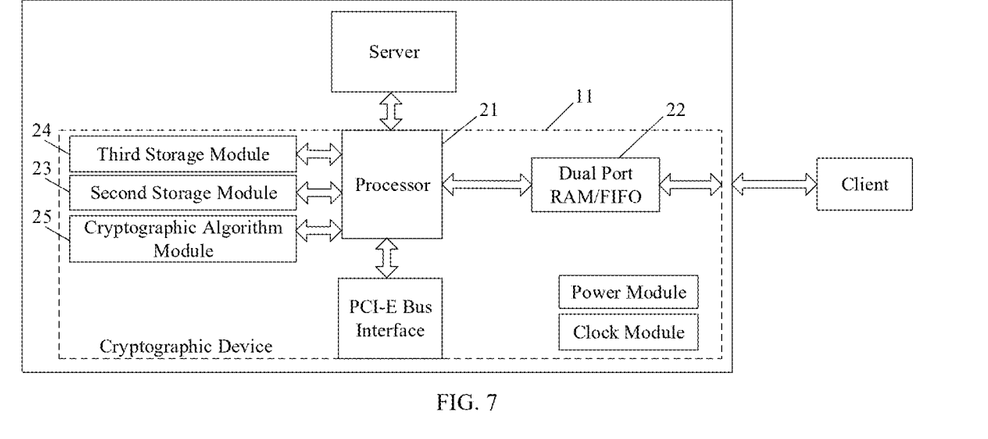
FIG. 7 is a schematic diagram of a data encryption apparatus based on a dual port first storage module according to the present disclosure.

As shown in FIG. 7, FIG. 7 is a schematic diagram of a data encryption apparatus based on a dual port first storage module according to the present disclosure.

In an embodiment of the present disclosure, after each piece of the data is written into the first storage module 22, the method further includes:
triggering the client to read the data from the first storage module 22 in real time.

For scenarios that require high data processing speed or a large amount of data, in order to improve the efficiency of data processing, it is not necessary to wait until all the data is processed, the client can be triggered to process the data in the first storage module 22 as long as the processor 21 writes the data into the first storage module 22, which has real-time performance, thereby ensuring the continuity of data processing, and improving the efficiency of the system.

In an embodiment of the present disclosure, the first storage module 22 is a dual port memory or a dual port storage queue.

In the case where the client reads the data in the first storage module 22 in real time, the function of reading and writing at the same time may be realized by adding a data interface. At this time, the first storage module 22 can be set as the dual port memory or the dual port storage queue, for example, the dual port RAM or the first input first output queue (FIFO).

Figure 8:
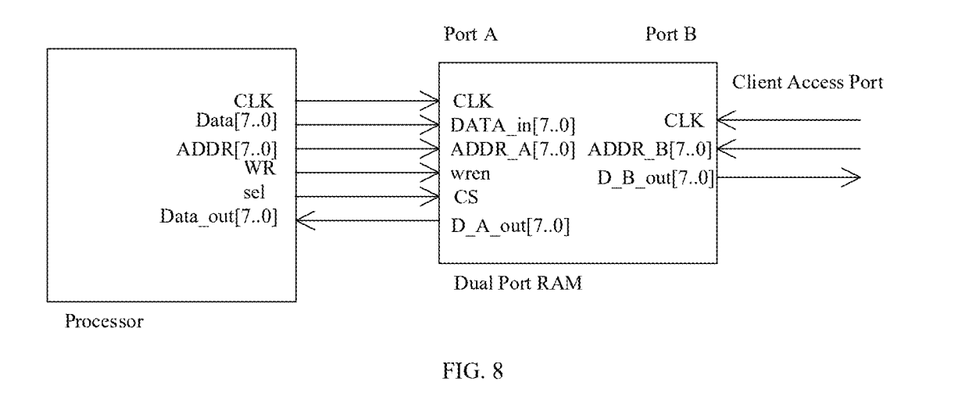
FIG. 8 is a schematic diagram of a port setting and a connection method with a processor of a dual port random access memory (RAM) according to the present disclosure.

When the first storage module 22 is the dual port RAM, referring to FIG. 8, FIG. 8 is a schematic diagram of a port setting and a connection method with a processor of a dual port RAM according to the present disclosure. A port A of the dual port RAM is a host access interface, and the processor 21 performs read/write operations on the data from the RAM through the port A, where CLK represents a clock signal and is connected to a system clock source; DATA_in[7 . . . 0] represents a data input interface through which the processor 21 writes the data to the RAM; ADDR_A[7 . . . 0] represents an address input signal of the RAM, and the processor 21 selects to start performing read/write operations of the data from a certain address unit of the RAM, in this example, an 8-bit address [7 . . . 0] is provided, and thus a storage space is 256 bytes, and a larger RAM address space can be set according to specific practical applications; wren represents a write enable signal for the RAM, which is valid at high level, and write operations can be performed on the RAM only when this signal is valid; CS represents a RAM selection signal, which is valid at high level, and operations can be performed on the RAM only when this signal is valid; and D_A_out[7 . . . 0] represents a data output interface through which the processor 21 reads the data from the RAM. A port B represents an interface that the client accesses independently, where the CLK is also connected to the system clock source to keep clock synchronization with the system; ADDR_B[7 . . . 0] represents an address input signal for the RAM, and the client selects to start reading the data from a certain address unit of the RAM; and D_B_out[7 . . . 0] represents a data output interface through which the client reads the data from the RAM.

In this solution, the processor 21 and the client may operate the RAM independently, and the client may read the data in the RAM at any time without waiting for the processor 21 to store all the data in the RAM, thereby improving the speed of data processing.

Figure 9:
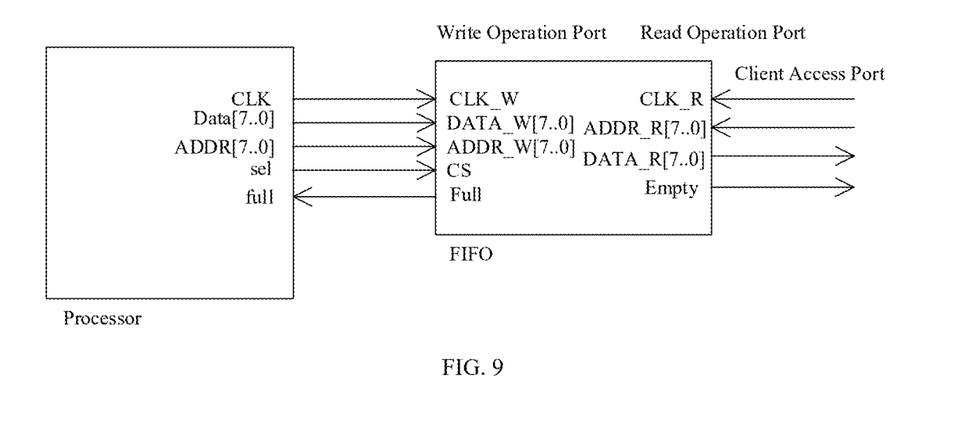
FIG. 9 is a schematic diagram of a port setting and a connection method with a processor of a first input first output (FIFO) according to the present disclosure.

When the first storage module 22 is a first input first output (FIFO), referring to FIG. 9, FIG. 9 is a schematic diagram of a port setting and a connection method with a processor 21 of the FIFO according to the present disclosure. A write operation port of the FIFO is used by the processor 21 to perform write operations of the data on the FIFO, where CLK_W represents a clock signal for the write operations and is connected to the system clock source; DATA W[7 . . . 0] represents a data input interface through which the processor 21 writes the data to the FIFO; ADDR_W[7 . . . 0] represents an address input signal of the FIFO through which the processor 21 selects to start performing write operations of the data from a certain address of the FIFO, in this example, an 8-bit address [7 . . . 0] is provided, and a larger FIFO address space [n . . . 0] can be set according to actual needs; Full represents a full signal of the FIFO; a high level means that the data input into the FIFO is already full, and no more data can be written into the FIFO; a low level means that the data in the FIFO is not yet fully stored, and data can continue to be stored in the FIFO; CS represents a selection signal of the FIFO, which is active at high level, and operations can be performed on the FIFO only when this signal is active. A read operation port is an interface for the client to read data, where CLK_R represents a read operation clock, which is also connected to the system clock source and keeps clock synchronization with the system; ADDR_R[7 . . . 0] represents an address input signal for the FIFO, and the client selects to start performing read operations of the data from a certain address unit of the FIFO; DATA_R[7 . . . 0] represents a data output interface through which the client reads the data from the FIFO; Empty represents an empty signal of the FIFO; a high level means that there is no data in the FIFO, it is in an empty state and data cannot be read from the FIFO; and a low level means that there is data in the FIFO, it is in a non-empty state and can read the data from the FIFO.

In this solution, the processor 21 and the client may perform operations on the FIFO independently, and may detect whether the FIFO is in a non-empty state or a full storage state. As long as it is detected that the FIFO is in the non-empty state, the client may read the data in the FIFO without waiting for the processor 21 to store all the data in the FIFO, thereby improving the speed of data processing.

To sum up, in the data encryption apparatus of the present disclosure, the encryption and storage of the critical data are realized by hardware devices, thereby improving the security of critical data encryption and meeting the requirements of the information security field for the critical data encryption. In addition, the data may be selectively encrypted without encrypting all the to-be-processed data, and thus it is flexible and convenient. Further, in some embodiments of the present disclosure, dual port RAM and FIFO storage structures are used to further improve the data read/write efficiency. Finally, in some embodiments of the present disclosure, a plurality of state machine threads and a plurality of first/second storage modules are also provided to realize the function of concurrent processing of multiple groups of data, thereby meeting the requirements of various data applications of the client.

Figure 10:
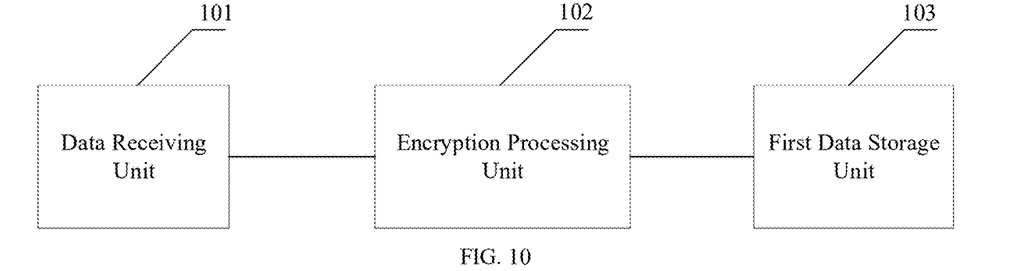
FIG. 10 is a structural block diagram of a data encryption apparatus according to the present disclosure.

In order to solve the above technical problems, the present disclosure further provides a data encryption apparatus. Referring to FIG. 10, FIG. 10 is a structural block diagram of a data encryption apparatus according to the present disclosure. The apparatus is applied to a processor 21 in a cryptographic device 11, where the cryptographic device 11 includes a first storage module 22, and the apparatus includes:

a data receiving unit 101 configured to receive to-be-processed data sent by a server, and distinguish critical data and non-critical data in the to-be-processed data;

an encryption processing unit 102 configured to perform encryption processing on the critical data in the to-be-processed data to obtain encrypted critical data; and a data storage unit 103 configured to write the encrypted critical data and the non-critical data into the first storage module 22 to enable a client to read data from the first storage module 22.

In an embodiment of the present disclosure, the data receiving unit 101 includes:

an identifying identifier unit configured to receive the to-be-processed data sent by the server, and identify whether each piece of to-be-processed data carries an encryption identifier; and a first determining unit configured to determine data carrying the encryption identifier as the critical data, and in response to not each piece of to-be-processed data carrying the encryption identifier, determine data not carrying the encryption identifier as the non-critical data.

In an embodiment of the present disclosure, the cryptographic device further includes a second storage module 23, and the apparatus further includes:
 a second storage unit configured to write one or more data identifiers corresponding to the critical data into the second storage module 23;
 the encryption processing unit 102 includes:
 an obtaining identifier unit configured to read the one or more data identifiers in the second storage module 23 when processing to-be-processed data that is currently required to be processed;
 a second determining unit configured to determining whether one or more identifiers of the to-be-processed data that is currently required to be processed are the same as the one or more data identifiers in the second storage module 23; in response to the one or more identifiers of the to-be-processed data that is currently required to be processed are the same as the one or more data identifiers in the second storage module 23, determining to-be-processed data with the same data identifiers as the critical data, and performing the encryption processing on the critical data in the to-be-processed data to obtain the encrypted critical data; and in response to the one or more identifiers not being the same as the one or more data identifiers, determining the to-be-processed data that is currently required to be processed as the non-critical data, and directly writing the non-critical data into the first storage module 22.

In an embodiment of the present disclosure, the processor 21 is provided with a first pointer and a second pointer, and the encryption processing unit 102 includes:
 a first pointer pointing unit configured to, when processing the to-be-processed data, control the first pointer to point to one piece of to-be-processed data that is currently required to be processed, and control the second pointer to point to one of the one or more data identifiers in the second storage module 23;
 a third determining unit configured to determine whether the data identifier pointed to by the second pointer and the identifier corresponding to the to-be-processed data pointed to by the first pointer are the same; and in response to the data identifier pointed to by the second pointer and the identifier corresponding to the to-be-processed data pointed to by the first pointer being the same, determine the to-be-processed data pointed to by the first pointer as the critical data, and performing the encryption processing on the critical data pointed to by the first pointer to obtain the encrypted critical data, and in response to the data identifier not being the same as the identifier, determine the to-be-processed data pointed to by the first pointer as the non-critical data;
 the data storage unit 103 includes:
 a first subdata storage unit configured to write the encrypted critical data into the first storage module 22, control the first pointer to point to next piece of to-be-processed data, and control the second pointer to point to a next data identifier; and
 a second subdata storage unit configured to write the non-critical data into the first storage module 22, and control the first pointer to point to the next piece of to-be-processed data.

In an embodiment of the present disclosure, there are N first storage modules 22 and N second storage modules 23, the processor is provided with N state machine threads, N first pointers and N second pointers, and the N state machine threads, the N first pointers, the N second pointers, the N first storage modules 22 and the N second storage modules 23 are in a one-to-one correspondence, where N is an integer greater than 1,
 the encryption processing unit 102 includes:
 a second pointer pointing unit configured to, when processing the to-be-processed data, control the N first pointers to respectively point to N pieces of to-be-processed data that are currently required to be processed in parallel through the N state machine threads, and control each of the N second pointers to point to a data identifier in the second storage module 23 corresponding to the second pointer;
 a fourth determining unit configured to determine whether the data identifier pointed to by the second pointer is the same as the identifier corresponding to the to-be-processed data pointed to by the first pointer corresponding to the second pointer; in response to the data identifier pointed to by the second pointer being the same as the identifier corresponding to the to-be-processed data pointed to by the first pointer corresponding to the second pointer, determine the to-be-processed data pointed to by the first pointer as the critical data, and perform the encryption processing on the critical data pointed to by the first pointer to obtain the encrypted critical data; and in response to the data identifier not being the same as the identifier, determine the to-be-processed data pointed to by the first pointer as the non-critical data;
 the data storage unit 103 includes:
 a third subdata storage unit configured to write the encrypted critical data into the first storage module 22 corresponding to the first pointer, control the first pointer to point to the next piece of to-be-processed data, and control the second pointer to point to the next data identifier in the second storage module 23 corresponding to the second pointer; and
 a fourth subdata storage unit configured to directly write the non-critical data pointed to by the first pointer into the first storage module 22 corresponding to the first pointer, and control the first pointer to point to the next piece of to-be-processed data.

In an embodiment of the present disclosure, the apparatus further includes:
 a control signal receiving unit configured to receive a control signal sent by the server, and determine a plurality of first target storage modules based on the control signal; and
 a control unit configured to control the determined first target storage modules and the second storage module 23 corresponding to each of the determined first storage modules to be in a working state.

In an embodiment of the present disclosure, reading, by the client, the data from the first storage module 22 includes:
 enabling, by the client, N state machine threads and reading the data from the N first storage modules 22 in parallel through the N state machine threads,
 where the N state machine threads are in a one-to-one correspondence with the N first storage modules 22.

In an embodiment of the present disclosure, after each piece of the data is written into the first storage module 22, the apparatus further includes:
 a fifth determining unit configured to determine whether the processing of all received to-be-processed data is completed; and a reading control unit configured to determine whether to trigger the client to read the data from the first storage module 22 based on a result of the determining.

In an embodiment of the present disclosure, the fifth determining unit includes:

a sixth determining unit configured to, when it is determined that the processing of all received to-be-processed data is completed, trigger the client to read the data from the first storage module 22, and when it is determined that the processing of all received to-be-processed data is not completed, not trigger the client to read the data from the first storage module 22.

In an embodiment of the present disclosure, the first storage module 22 is a single port memory or a single port storage queue.

In an embodiment of the present disclosure, after each piece of the data is written into the first storage module 22, the apparatus further includes:

a real-time reading unit configured to trigger the client to read the data from the first storage module 22 in real time.

In an embodiment of the present disclosure, the first storage module 22 is a dual port memory or a dual port storage queue.

In an embodiment of the present disclosure, the data identifier is a serial number corresponding to the critical data.

In an embodiment of the present disclosure, the second storage module 23 is a register group comprising a plurality of registers, and each of the plurality of registers stores a data identifier.

In an embodiment of the present disclosure, the encryption processing unit 102 is configured to perform the encryption processing on the critical data using a symmetric cryptographic algorithm to obtain the encrypted critical data.

In an embodiment of the present disclosure, the cryptographic device 11 further includes an encryption module connected to the processor 21, and the encryption processing unit 102 includes:

a data sending unit configured to send the critical data to the encryption module to enable the encryption module to perform the encryption processing on the critical data to obtain encrypted critical data; and an encrypted data receiving unit configured to receive the encrypted critical data sent by the encryption module, and perform the step of writing the encrypted critical data into the first storage module 22.

In an embodiment of the present disclosure, the cryptographic device 11 further includes a third storage module 24 connected to the processor, the encryption processing unit 102 includes:

an encryption parameter reading unit configured to read encryption parameters stored in the third storage module 24, and perform the encryption processing on the critical data based on the encryption parameters to obtain the encrypted critical data.

In an embodiment of the present disclosure, the third storage module 24 is a non-transitory memory.

Figure 11:
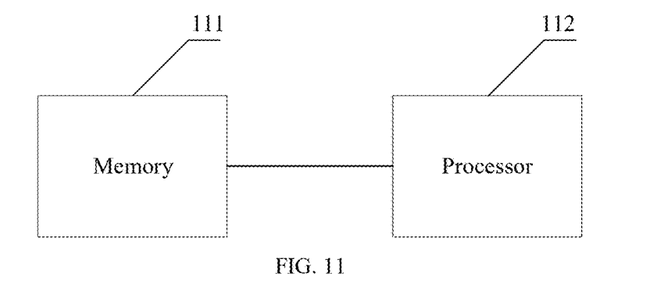
FIG. 11 is a structural block diagram of an electronic device according to the present disclosure.

In order to solve the above technical problems, the present disclosure further provides an electronic device. Referring to FIG. 11, FIG. 11 is a structural block diagram of an electronic device according to the present disclosure. The electronic device includes:

a memory 111 configured to store a computer program; and a processor 112 configured to, when executing the computer program, implement the steps of the data encryption method described above.

Figure 12:
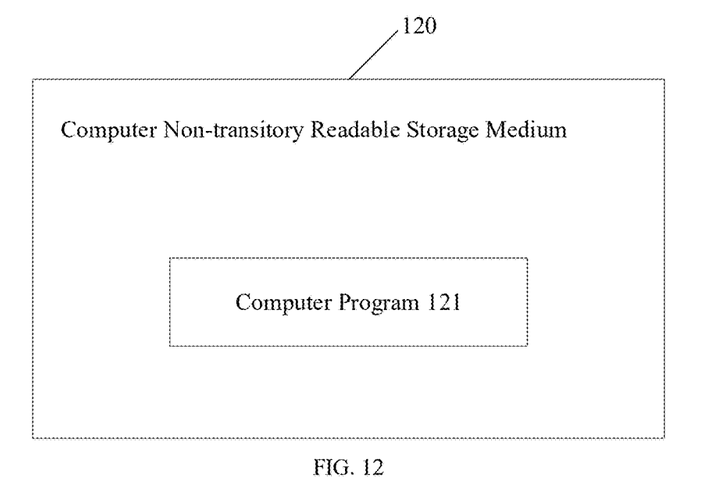
FIG. 12 is a structural block diagram of a computer non-transitory readable storage medium according to the present disclosure.

In order to solve the above technical problems, the present disclosure further provides a computer non-transitory readable storage medium. Referring to FIG. 12, FIG. 12 is a structural block diagram of a computer non-transitory readable storage medium according to the present disclosure. A computer program 121 is stored on the computer non-transitory readable storage medium 120, and when the computer program 121 is executed by the processor 21, the steps of the data encryption method described above are implemented.

In order to solve the above technical problems, the present disclosure further provides a server, including the above electronic device. For the introduction of the server, refer to the above embodiments, and the present disclosure will not be repeated here.

It should also be noted that in the present specification, relationship terms such as first and second are merely intended to distinguish one entity or operation from another entity or operation, and do not necessarily require or imply any such actual relationship or order between those entities or operations. Further, the terms "includes", "comprises" or any other variation thereof are intended to cover non-exclusive inclusion, such that a process, method, article, or device including a series of elements includes not only those elements, but also other elements not expressly listed, or elements that are inherent to such a process, method, article, or device. Without further limitation, the elements defined by the statement "including a . . . " do not preclude the existence of additional identical elements in the process, method, article, or device that include the elements.

The above description of the disclosed embodiments enables a person skilled in the art to implement or use the present disclosure. Various modifications to these embodiments will be apparent to a person skilled in the art, and the general principles defined herein can be implemented in other embodiments without departing from the spirit or scope of the present disclosure. Therefore, the present disclosure will not be limited to the embodiments shown herein, but is to be accorded the widest scope consistent with the principles and novel features disclosed in the present disclosure.

The invention claimed is:

1. A data encryption method, applied to a processor in a cryptographic device, wherein the cryptographic device comprises a first storage module, and the method comprises:

receiving to-be-processed data sent by a server, and distinguishing critical data and non-critical data in the to-be-processed data;

performing encryption processing on the critical data in the to-be-processed data to obtain encrypted critical data; and writing the encrypted critical data and the non-critical data into the first storage module to enable a client to read data from the first storage module, wherein the cryptographic device further comprises a second storage module, after distinguishing the critical data and the non-critical data in the to-be-processed data, the method further comprises:

writing one or more data identifiers corresponding to the critical data into the second storage module;

performing the encryption processing on the critical data in the to-be-processed data to obtain the encrypted critical data comprises:
reading the one or more data identifiers in the second storage module when processing to-be-processed data that is currently required to be processed;
determining whether one or more identifiers of the to-be-processed data that is currently required to be processed are the same as the one or more data identifiers in the second storage module;
in response to the one or more identifiers being the same as the one or more data identifiers, determining to-be-processed data with the same data identifiers as the critical data, and performing the encryption processing on the critical data in the to-be-processed data to obtain the encrypted critical data; and
in response to the one or more identifiers not being the same as the one or more data identifiers, determining the to-be-processed data that is currently required to be processed as the non-critical data, and directly writing the non-critical data into the first storage module,
wherein the first storage module is a memory or a storage queue, the second storage module is a register group comprising a plurality of registers, and each of the plurality of registers stores a data identifier.

2. The data encryption method according to claim 1, wherein receiving the to-be-processed data sent by the server, and distinguishing the critical data and the non-critical data in the to-be-processed data comprises:
receiving the to-be-processed data sent by the server, and identifying whether each piece of to-be-processed data carries an encryption identifier; and
in response to each piece of to-be-processed data carrying the encryption identifier, determining data carrying the encryption identifier as the critical data, and in response to not each piece of to-be-processed data carrying the encryption identifier, determining data not carrying the encryption identifier as the non-critical data.

3. The data encryption method according to claim 1, wherein the processor is provided with a first pointer and a second pointer, and performing the encryption processing on the critical data in the to-be-processed data to obtain the encrypted critical data comprises:
when processing the to-be-processed data, controlling the first pointer to point to one piece of to-be-processed data that is currently required to be processed, and controlling the second pointer to point to one of the one or more data identifiers in the second storage module;
determining whether the data identifier pointed to by the second pointer and the identifier corresponding to the to-be-processed data pointed to by the first pointer are the same; and
in response to the data identifier being the same as the identifier, determining the to-be-processed data pointed to by the first pointer as the critical data, and performing the encryption processing on the critical data pointed to by the first pointer to obtain the encrypted critical data, and in response to the data identifier not being the same as the identifier, determining the to-be-processed data pointed to by the first pointer as the non-critical data;
writing the encrypted critical data and the non-critical data into the first storage module comprises:
writing the encrypted critical data into the first storage module, controlling the first pointer to point to next piece of to-be-processed data, and controlling the second pointer to point to a next data identifier; and
writing the non-critical data into the first storage module, and controlling the first pointer to point to the next piece of to-be-processed data.

4. The data encryption method according to claim 3, wherein there are N first storage modules and N second storage modules, the processor is provided with N state machine threads, N first pointers and N second pointers, and the N state machine threads, the N first pointers, the N second pointers, the N first storage modules and the N second storage modules are in a one-to-one correspondence, wherein N is an integer greater than 1,
performing the encryption processing on the critical data in the to-be-processed data to obtain the encrypted critical data comprises:
when processing the to-be-processed data, controlling the N first pointers to respectively point to N pieces of to-be-processed data that are currently required to be processed in parallel through the N state machine threads, and controlling each of the N second pointers to point to a data identifier in the second storage module corresponding to the second pointer;
determining whether the data identifier pointed to by the second pointer is the same as the identifier corresponding to the to-be-processed data pointed to by the first pointer corresponding to the second pointer;
in response to the data identifier being the same as the identifier, determining the to-be-processed data pointed to by the first pointer as the critical data, and performing the encryption processing on the critical data pointed to by the first pointer to obtain the encrypted critical data; and
in response to the data identifier not being the same as the identifier, determining the to-be-processed data pointed to by the first pointer as the non-critical data;
writing the encrypted critical data and the non-critical data into the first storage module comprises:
writing the encrypted critical data into the first storage module corresponding to the first pointer, controlling the first pointer to point to the next piece of to-be-processed data, and controlling the second pointer to point to the next data identifier in the second storage module corresponding to the second pointer; and
directly writing the non-critical data pointed to by the first pointer into the first storage module corresponding to the first pointer, and controlling the first pointer to point to the next piece of to-be-processed data.

5. The data encryption method according to claim 4, further comprising:
receiving a control signal sent by the server, and determining a plurality of first target storage modules based on the control signal; and
controlling the determined first target storage modules and the second storage module corresponding to each of the determined first storage modules to be in a working state.

6. The data encryption method according to claim 4, wherein reading, by the client, the data from the first storage module comprises:
enabling, by the client, N state machine threads and reading the data from the N first storage modules in parallel through the N state machine threads,
wherein the N state machine threads are in a one-to-one correspondence with the N first storage modules.

7. The data encryption method according to claim 3, wherein after each piece of the data is written into the first storage module, the method further comprises:

determining whether the processing of all received to-be-processed data is completed; and determining whether to trigger the client to read the data from the first storage module based on a result of the determining.

8. The data encryption method according to claim 7, wherein determining whether to trigger the client to read the data from the first storage module based on the result of the determining comprises:

when it is determined that the processing of all received to-be-processed data is completed, triggering the client to read the data from the first storage module, and when it is determined that the processing of all received to-be-processed data is not completed, not triggering the client to read the data from the first storage module.

9. The data encryption method according to claim 8, wherein the first storage module is a single port memory or a single port storage queue.

10. The data encryption method according to claim 7, wherein after each piece of the data is written into the first storage module, the method further comprises:

triggering the client to read the data from the first storage module in real time.

11. The data encryption method according to claim 10, wherein the first storage module is a dual port memory or a dual port storage queue.

12. The data encryption method according to claim 1, wherein the data identifier is a serial number corresponding to the critical data.

13. The data encryption method according to claim 1, wherein performing the encryption processing on the critical data in the to-be-processed data to obtain the encrypted critical data comprises:

performing the encryption processing on the critical data using a symmetric cryptographic algorithm to obtain the encrypted critical data.

14. The data encryption method according to claim 1, wherein the cryptographic device further comprises an encryption module connected to the processor, and performing the encryption processing on the critical data in the to-be-processed data to obtain the encrypted critical data comprises:

sending the critical data to the encryption module to enable the encryption module to perform the encryption processing on the critical data to obtain encrypted critical data; and receiving the encrypted critical data sent by the encryption module, and performing the step of writing the encrypted critical data into the first storage module.

15. The data encryption method according to claim 14, wherein the cryptographic device further comprises a third storage module connected to the processor, performing the encryption processing on the critical data in the to-be-processed data to obtain the encrypted critical data comprises:

reading encryption parameters stored in the third storage module, and performing the encryption processing on the critical data based on the encryption parameters to obtain the encrypted critical data.

16. The data encryption method according to claim 15, wherein the third storage module is a non-transitory memory.

17. An electronic device, comprising:

a memory configured to store a computer program; and a processor configured to, when executing the computer program, implement the operations comprising:

receiving to-be-processed data sent by a server, and distinguishing critical data and non-critical data in the to-be-processed data;

performing encryption processing on the critical data in the to-be-processed data to obtain encrypted critical data; and writing the encrypted critical data and the non-critical data into the first storage module to enable a client to read data from the first storage module, wherein the cryptographic device further comprises a second storage module, after distinguishing the critical data and the non-critical data in the to-be-processed data, the method further comprises:

writing one or more data identifiers corresponding to the critical data into the second storage module;

performing the encryption processing on the critical data in the to-be-processed data to obtain the encrypted critical data comprises:

reading the one or more data identifiers in the second storage module when processing to-be-processed data that is currently required to be processed;

determining whether one or more identifiers of the to-be-processed data that is currently required to be processed are the same as the one or more data identifiers in the second storage module;

in response to the one or more identifiers being the same as the one or more data identifiers, determining to-be-processed data with the same data identifiers as the critical data, and performing the encryption processing on the critical data in the to-be-processed data to obtain the encrypted critical data; and in response to the one or more identifiers not being the same as the one or more data identifiers, determining the to-be-processed data that is currently required to be processed as the non-critical data, and directly writing the non-critical data into the first storage module, wherein the first storage module is a memory or a storage queue, the second storage module is a register group comprising a plurality of registers, and each of the plurality of registers stores a data identifier.

18. A server, comprising the electronic device according to claim 17.

19. The electronic device according to claim 17, wherein the processor is further configured to implement the operations comprising:

receiving the to-be-processed data sent by the server, and identifying whether each piece of to-be-processed data carries an encryption identifier; and in response to each piece of to-be-processed data carrying the encryption identifier, determining data carrying the encryption identifier as the critical data, and in response to not each piece of to-be-processed data carrying the encryption identifier, determining data not carrying the encryption identifier as the non-critical data.

20. A computer non-transitory readable storage medium storing a computer program, wherein the computer program, when executed by a processor, causes the processor to perform operations comprising:

receiving to-be-processed data sent by a server, and distinguishing critical data and non-critical data in the to-be-processed data;

performing encryption processing on the critical data in the to-be-processed data to obtain encrypted critical data; and writing the encrypted critical data and the non-critical data into the first storage module to enable a client to read data from the first storage module, wherein the cryptographic device further comprises a second storage module, after distinguishing the critical data and the non-critical data in the to-be-processed data, the method further comprises:

writing one or more data identifiers corresponding to the critical data into the second storage module;

performing the encryption processing on the critical data in the to-be-processed data to obtain the encrypted critical data comprises:

reading the one or more data identifiers in the second storage module when processing to-be-processed data that is currently required to be processed;

determining whether one or more identifiers of the to-be-processed data that is currently required to be processed are the same as the one or more data identifiers in the second storage module;

in response to the one or more identifiers being the same as the one or more data identifiers, determining to-be-processed data with the same data identifiers as the critical data, and performing the encryption processing on the critical data in the to-be-processed data to obtain the encrypted critical data; and in response to the one or more identifiers not being the same as the one or more data identifiers, determining the to-be-processed data that is currently required to be processed as the non-critical data, and directly writing the non-critical data into the first storage module, wherein the first storage module is a memory or a storage queue, the second storage module is a register group comprising a plurality of registers, and each of the plurality of registers stores a data identifier.

\* \* \* \* \*